US011377222B2

(12) United States Patent
Luszcz

(10) Patent No.: US 11,377,222 B2
(45) Date of Patent: *Jul. 5, 2022

(54) POWER MANAGEMENT BETWEEN A PROPULSOR AND A COAXIAL ROTOR OF A HELICOPTER

(71) Applicant: SIKORSKY AIRCRAFT CORPORATION, Stratford, CT (US)

(72) Inventor: Matthew T. Luszcz, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 179 days.

This patent is subject to a terminal disclaimer.

(21) Appl. No.: 16/530,264

(22) Filed: Aug. 2, 2019

(65) Prior Publication Data
US 2019/0352014 A1 Nov. 21, 2019

Related U.S. Application Data

(63) Continuation of application No. 15/504,248, filed as application No. PCT/US2015/053116 on Sep. 30, 2015, now Pat. No. 10,414,512.

(Continued)

(51) Int. Cl.
*B64D 31/06* (2006.01)
*B64C 27/22* (2006.01)
(Continued)

(52) U.S. Cl.
CPC ............ *B64D 31/06* (2013.01); *B64C 11/305* (2013.01); *B64C 27/10* (2013.01); *B64C 27/22* (2013.01);
(Continued)

(58) Field of Classification Search
CPC ......... B64C 27/22; B64C 27/24; B64C 27/26; B64C 27/28; B64C 27/30; B64C 27/57;
(Continued)

(56) References Cited

U.S. PATENT DOCUMENTS 3,129,768 A * 4/1964 Collins .................. B64C 27/32
416/27
3,309,868 A * 3/1967 Downing ............... B64C 27/12
60/791
(Continued)

FOREIGN PATENT DOCUMENTS

EP 1310645 A2 5/2003
GB 2217477 A * 10/1989 ................ F02C 9/28

OTHER PUBLICATIONS

Wood, T.L. et al., "An energy method for prediction of helicopter maneuverability", NTIS Report AD-A021 266, BHC Report 299-099-557, Dec. 1971, 113 pages (Year: 1971).*

(Continued)

*Primary Examiner* — David A Testardi
(74) *Attorney, Agent, or Firm* — Michael Best & Friedrich LLP

(57) ABSTRACT

One aspect is a flight control system for a rotary wing aircraft that includes flight control computer configured to interface with a main rotor system, a translational thrust system, and an engine control system. The flight control computer includes processing circuitry configured to execute control logic. The control logic includes a primary flight control configured to produce flight control commands for the main rotor system and the translational thrust system. A main engine anticipation logic is configured to produce a rotor power demand associated with the main rotor system. A propulsor loads engine anticipation logic is configured to produce an auxiliary propulsor power demand associated with the translational thrust system. The flight control computer providing the engine control system with a total power demand anticipation signal based on a combination of the rotor power demand and the auxiliary propulsor power demand.

23 Claims, 5 Drawing Sheets

Related U.S. Application Data

(60) Provisional application No. 62/058,133, filed on Oct. 1, 2014.

(51) Int. Cl.
 *B64C 11/30* (2006.01)
 *B64C 27/10* (2006.01)
 *B64C 27/82* (2006.01)
 *B64D 35/00* (2006.01)
 *B64C 27/57* (2006.01)

(52) U.S. Cl.
 CPC .............. *B64C 27/57* (2013.01); *B64C 27/82* (2013.01); *B64D 35/00* (2013.01); *B64C 2027/8236* (2013.01); *B64C 2027/8281* (2013.01)

(58) Field of Classification Search
 CPC ............ B64C 27/82; B64C 2027/8236; B64C 11/305; B64C 27/10; B64D 31/06; B64D 35/00; G05D 1/0858; G05B 13/026; G05B 13/048; F02C 9/28
 See application file for complete search history.

(56) References Cited

U.S. PATENT DOCUMENTS

| | | | | |
|---|---|---|---|---|
| 3,930,366 | A * | 1/1976 | Nelson | F02C 9/42 60/39.15 |
| 4,276,744 | A * | 7/1981 | Pisano | F02C 9/28 60/791 |
| 4,644,744 | A * | 2/1987 | Mittendorf | F02C 9/28 60/39.15 |
| 4,993,221 | A * | 2/1991 | Idelchik | F02C 9/28 60/39.281 |
| 4,998,202 | A * | 3/1991 | Walsh | G05D 1/0858 701/100 |
| 5,265,825 | A | 11/1993 | Ebert et al. | |
| 5,265,826 | A | 11/1993 | Ebert | |
| 5,314,147 | A * | 5/1994 | Ebert | G05D 1/0858 244/17.13 |
| 6,171,055 | B1 * | 1/2001 | Vos | F02C 9/44 416/1 |
| 6,729,139 | B2 | 5/2004 | Desai et al. | |
| 7,908,044 | B2 | 3/2011 | Piasecki et al. | |
| 7,931,231 | B2 | 4/2011 | Cherepinsky | |
| 8,170,728 | B2 | 5/2012 | Roesch | |
| 8,442,740 | B2 | 5/2013 | Rossotto | |
| 10,414,512 | B2 * | 9/2019 | Luszcz | B64D 35/04 244/17.13 |
| 2002/0128759 | A1 * | 9/2002 | Sodoski | B60L 15/2045 701/36 |
| 2003/0135305 | A1 * | 7/2003 | Zagranski | B64C 27/12 701/3 |
| 2003/0135306 | A1 * | 7/2003 | Driscoll | F02C 9/58 701/3 |
| 2006/0269413 | A1 * | 11/2006 | Cotton | B64C 27/82 416/170 R |
| 2008/0237392 | A1 | 10/2008 | Piasecki et al. | |
| 2008/0283671 | A1 * | 11/2008 | Cherepinsky | B64C 13/505 244/195 |
| 2008/0294305 | A1 * | 11/2008 | Roesch | B64C 27/22 701/3 |
| 2009/0186320 | A1 * | 7/2009 | Rucci | G09B 9/206 434/33 |
| 2009/0321554 | A1 * | 12/2009 | Roesch | B64C 27/26 244/6 |
| 2010/0102625 | A1 | 4/2010 | Karimi et al. | |
| 2010/0127119 | A1 * | 5/2010 | Waide | B64D 31/12 244/60 |
| 2010/0243792 | A1 * | 9/2010 | Queiras | B64C 27/26 244/6 |
| 2010/0308178 | A1 * | 12/2010 | Gemmati | B64C 27/58 244/230 |
| 2010/0310371 | A1 * | 12/2010 | Eglin | B64C 27/22 416/1 |
| 2010/0312421 | A1 * | 12/2010 | Eglin | B64C 27/04 701/14 |
| 2010/0324758 | A1 * | 12/2010 | Piasecki | B64C 27/26 701/3 |
| 2011/0036954 | A1 | 2/2011 | Piasecki | |
| 2011/0178648 | A1 | 7/2011 | Calvignac et al. | |
| 2013/0079956 | A1 | 3/2013 | Eglin | |
| 2013/0094963 | A1 * | 4/2013 | Rolt | B64C 27/24 416/1 |
| 2013/0181087 | A1 * | 7/2013 | Long | B64D 35/04 244/17.13 |
| 2013/0184958 | A1 * | 7/2013 | Dyrla | B60K 6/00 701/99 |
| 2013/0221153 | A1 * | 8/2013 | Worsham, II | G05D 1/0858 244/17.13 |
| 2014/0229036 | A1 | 8/2014 | Vallart | |
| 2015/0159499 | A1 * | 6/2015 | Bacic | F01D 11/20 415/1 |
| 2015/0219528 | A1 * | 8/2015 | Djelassi | F02C 9/28 702/44 |
| 2016/0186669 | A1 * | 6/2016 | Djelassi | G05B 11/01 701/100 |
| 2017/0203832 | A1 * | 7/2017 | Luszcz | G01C 23/00 |
| 2017/0275011 | A1 | 9/2017 | Luszcz | |

OTHER PUBLICATIONS

Stephens, Ernie, "Pilot Report: The exciting, experimental, exceptional X3", Rotor & Wing Magazine, Aug. 2012, pp. 26 to 28. (Year: 2012).*

English Oxford Living Dictionaries definition, "Power", retrieved Nov. 26, 2018, 6 pages (Year: 2018).

Hall, Stan, "How to determine the part throttle RPM of a fixed-pitch propeller at a given horsepower" (c)2000-2002 Stan Hall, retrieved from http://www.eaa62.org/technotes/prop.htm, 62 pages (Year: 2002).

Speas, Rebecca Barnett, "The functional application of the propeller load curve for fixed pitch propellers", Master's Thesis, University of Tennessee, 2006, 50 pages (Year: 2006).

Stefanv.com article, "Propeller basics", Mar. 1, 2002, Sailplane & Electric Modeler magazine, 12 pages (Year: 2002).

* cited by examiner

POWER MANAGEMENT BETWEEN A PROPULSOR AND A COAXIAL ROTOR OF A HELICOPTER

CROSS-REFERENCE TO RELATED APPLICATION

The present application is a continuation application and claims priority to pending U.S. National Stage application Ser. No. 15/504,248, filed Feb. 15, 2017, which claims priority to PCT Application No. PCT/US 2015/053116, filed Sep. 30, 2015, which in turn claims priority to U.S. Provisional Application Ser. No. 62/058,133, filed Oct. 1, 2014, the contents of which are incorporated herein by reference.

BACKGROUND OF THE INVENTION

Embodiments of the invention generally relate to a control system of a rotary wing aircraft, and more particularly, to power management between a propulsor and a coaxial rotor of a helicopter.

A rotary wing aircraft with a coaxial contra-rotating rotor system is capable of higher speeds as compared to conventional single rotor helicopters due in part to the balance of lift between advancing sides of the main rotor blades on the upper and lower rotor systems. To still further increase airspeed, supplemental translational thrust is provided by a translational thrust system including an integrated propulsor unit with a propulsor (e.g., a propeller) oriented substantially horizontal and parallel to the aircraft longitudinal axis to provide thrust for high speed flight.

In a rotary-wing aircraft application, engine anticipation may be part of the engine control system to maintain rotor speed within a relatively narrow range in response to demanded torque from the rotary-wing aircraft rotor system. The capability of the engine control system to correctly anticipate changes in power required directly impacts rotor speed governor performance. Engine anticipation conventionally focuses on collective changes affecting main rotor power demand. On a helicopter with an integrated propulsor unit, the propulsor contributes a significant fraction of the total power required in many flight regimes, and collective-based anticipation is insufficient to adequately control rotor speed.

Therefore, a need exists for an improved control for engine anticipation for propulsor loads on a helicopter.

BRIEF DESCRIPTION OF THE INVENTION

According to one embodiment, a flight control system for a rotary wing aircraft that includes a main rotor system, a translational thrust system, and an engine control system is provided. The flight control system includes a flight control computer configured to interface with the main rotor system, the translational thrust system, and the engine control system. The flight control computer includes processing circuitry configured to execute control logic. The control logic includes a primary flight control configured to produce flight control commands for the main rotor system and the translational thrust system. The control logic also includes main engine anticipation logic and propulsor loads engine anticipation logic. The main engine anticipation logic is configured to produce a rotor power demand associated with the main rotor system. The propulsor loads engine anticipation logic is configured to produce an auxiliary propulsor power demand associated with the translational thrust system. The flight control computer providing the engine control system with a total power demand anticipation signal based on a combination of the rotor power demand and the auxiliary propulsor power demand.

In addition to one or more of the features described above or below, or as an alternative, further embodiments include where the propulsor loads engine anticipation logic further includes a shaped propeller power demand model configured to produce a propulsor power demand value based on aircraft state data, and the auxiliary propulsor power demand is based on the propulsor power demand value.

In addition to one or more of the features described above or below, or as an alternative, further embodiments include where the translational thrust system has an auxiliary propulsor including a plurality of propeller blades.

In addition to one or more of the features described above or below, or as an alternative, further embodiments include where the aircraft state data includes a propeller pitch command for the propeller blades and a reference rotational rate of the auxiliary propulsor.

In addition to one or more of the features described above or below, or as an alternative, further embodiments include where the propeller pitch command and the rotational rate of the auxiliary propulsor are modeled parameters, and the aircraft state data further comprises: an airspeed of the rotary wing aircraft and a density of air as sensor-based data.

In addition to one or more of the features described above or below, or as an alternative, further embodiments include where the aircraft state data includes a propeller clutch engagement state of a propeller clutch and a propeller speed.

In addition to one or more of the features described above or below, or as an alternative, further embodiments include where the propulsor loads engine anticipation logic includes a filter configured to filter the propulsor power demand value to produce a filtered power demand value, and a drivetrain loss adjustment gain applied to the filtered power demand value to produce the auxiliary propulsor power demand.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Exemplary embodiments provide enhanced anticipation of aircraft power demand changes for a rotary wing aircraft employing auxiliary propulsion via a translational thrust system coupled to a primary drivetrain. Engine anticipation can be used to maintain rotor speed within a relatively narrow range in response to demanded torque. The ability to correctly anticipate changes in power required directly impact propulsion system performance. Embodiments allow an engine control system to more accurately and rapidly respond to changes in power demand due to an auxiliary propulsor that would otherwise generate fluctuations in drivetrain rotational speed. An embodiment is implemented via a shaped propeller power demand model that is a function of aircraft state data, such as airspeed, air density, propeller pitch of the auxiliary propulsor, and propeller rotational speed of the auxiliary propulsor. The shaped propeller power demand model can be embedded in a fly-by-wire control system of the aircraft and utilizes available aircraft state data. An estimated power demand for the auxiliary propulsor is combined with other power demand sources and provided to the engine control system as a feed forward anticipation signal.

Figure 1:
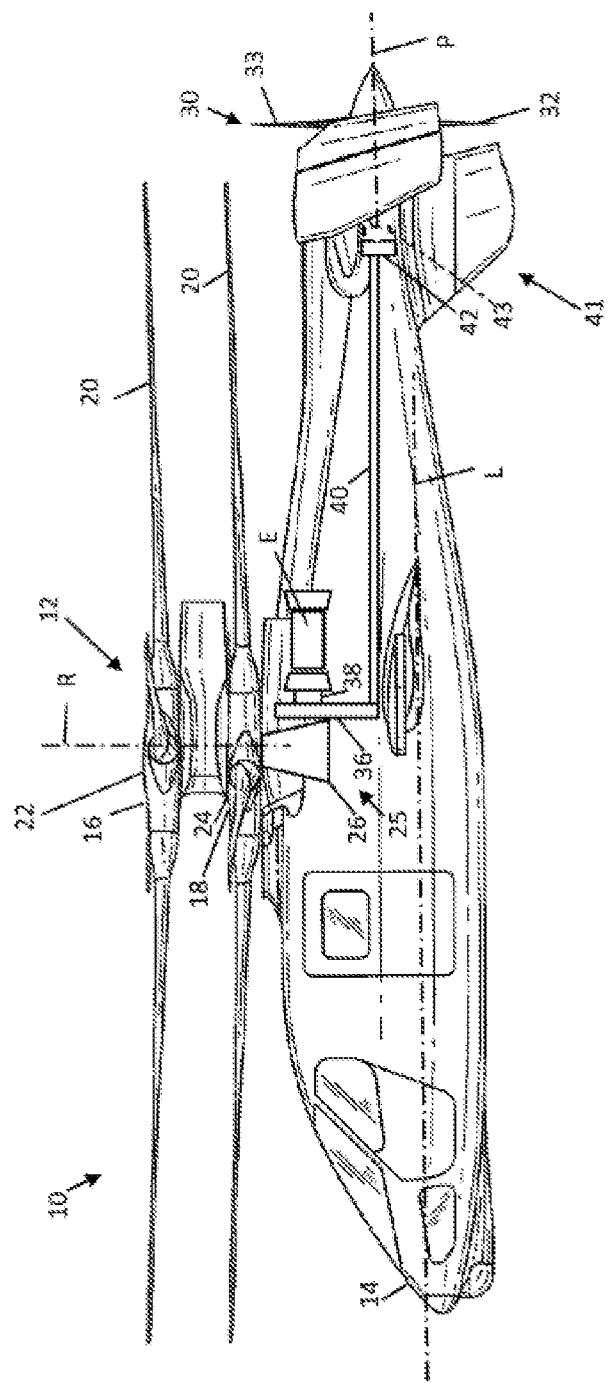
FIG. 1 is a general side view of an exemplary rotary wing aircraft for use in accordance with embodiments.
Figure 2:
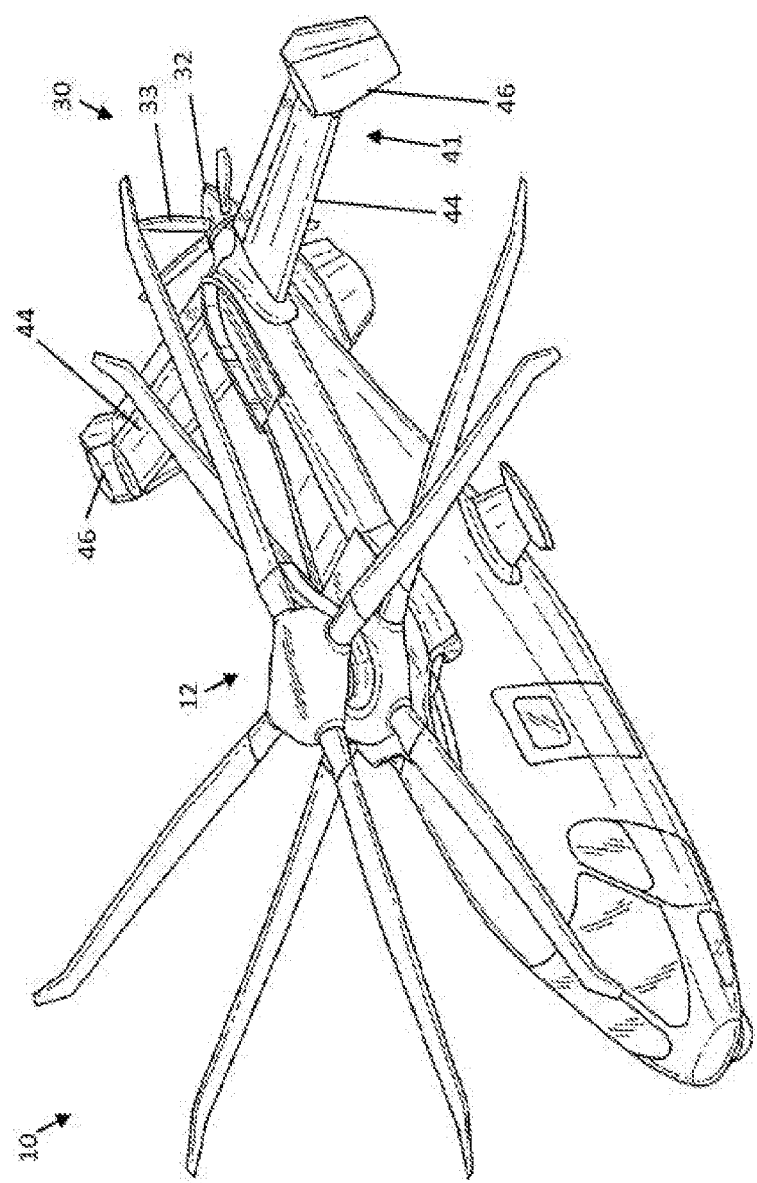
FIG. 2 is a perspective view of the exemplary rotary wing aircraft of FIG. 1.

FIGS. 1 and 2 illustrate an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft 10 includes an airframe 14 which supports the dual, contra-rotating, coaxial main rotor system 12 as well as a translational thrust system 30 which provides translational thrust generally parallel to an aircraft longitudinal axis L. Embodiments also apply to compound helicopter designs that may include, for example, wings that provide a significant contribution to high speed lift, offloading the rotor system.

With reference to FIGS. 1 and 2, the main rotor system 12 includes an upper rotor system 16 and a lower rotor system 18 as dual contra-rotating main rotors in a coaxial configuration. A plurality of rotor blade assemblies 20 are mounted to a rotor hub 22, 24 of each rotor system 16, 18, respectively. The main rotor system 12 is driven by a transmission 25. The translational thrust system 30 may be any propeller system including, but not limited to a pusher propeller, a tractor propeller, a nacelle mounted propeller, etc. In the example of FIGS. 1-2, the translational thrust system 30 includes an auxiliary propulsor 32. In an embodiment, the auxiliary propulsor 32 is a pusher propeller system with a propeller rotational axis P oriented substantially horizontal and parallel to the aircraft longitudinal axis L to provide thrust for high speed flight. The auxiliary propulsor 32 can be a puller propeller, for instance, a propeller mounted in front of the cockpit. The translational thrust system 30 may be driven through a main gearbox 26, which also drives the main rotor system 12. The auxiliary propulsor 32 may also provide reverse thrust, either for braking from high speed flight or for initiating rearward flight, or to achieve unusual hover attitudes.

The transmission 25 includes the main gearbox 26 driven by one or more engines, illustrated schematically at E. The main gearbox 26 and engines E are considered as part of the non-rotating frame of the aircraft 10. In the case of a rotary wing aircraft, the main gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with rotor systems are within the scope of the present invention.

The transmission 25 may also include a combiner gearbox 36 in meshing engagement with the main gearbox 26 and driven by one or more engines E. The engines E may drive the combiner gearbox 36 and the main gearbox 26 through a disconnecting mechanism, such as an overrunning clutch 38. The translational thrust system 30 can include a drive shaft 40 which is driven by the combiner gearbox 36 to drive the auxiliary propulsor 32 through an auxiliary propulsor gearbox 42. It should be understood that although the combiner gearbox 36 is schematically illustrated as a separate component, the combiner gearbox 36 may alternatively be incorporated directly into the main gearbox 26. A propeller clutch 43, similar to a manual clutch in an automobile, may be located at various positions in the transmission 25 or the translational thrust system 30 to clutch allows the pilot to operate with the propeller system disengaged, and the propeller spinning either at very low speed or not at all. For example, the propeller clutch 43 can be located up near the main gearbox 26, or near the auxiliary propulsor 32 itself, or anywhere in between.

In the example of FIGS. 1 and 2, the auxiliary propulsor 32 includes a plurality of propeller blades 33 and is positioned at a tail section 41 of the aircraft 10. During flight regimes, power demand can shift between the main rotor system 12 and the translational thrust system 30 due to a number of factors, which impacts overall power demand of the engines E. Exemplary embodiments provide a feed forward power demand to anticipate loads and conditions before they may be detectable by sensor based feedback.

Figure 3:
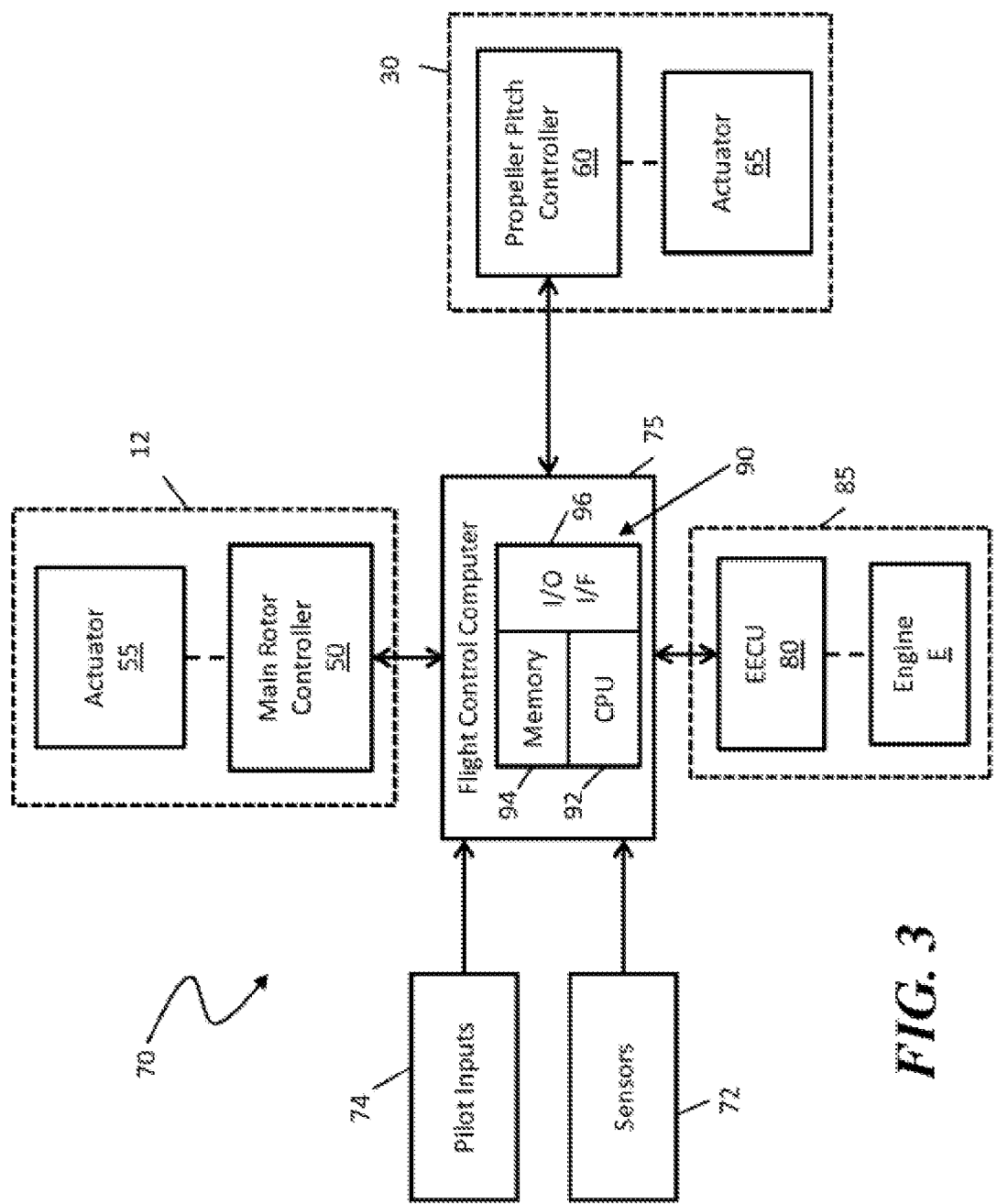
FIG. 3 is a schematic diagram of a flight control system of a rotary wing aircraft according to an embodiment.

Portions of the aircraft 10, such as the main rotor system 12 and the translational thrust system 30 for example, are driven by a flight control system 70 illustrated in FIG. 3. In one embodiment, the flight control system 70 is a fly-by-wire (FBW) control system. In an FBW control system, there is no direct mechanical coupling between a pilot's controls and movable components such as rotor blade assemblies 20 or propeller blades 33 of the aircraft 10 of FIGS. 1 and 2. Instead of using mechanical linkages, an FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands. In response to inputs from the sensors 72 and pilot inputs 74, the FCC 75 transmits signals to various subsystems of the aircraft 10, such as the main rotor system 12 and the translational thrust system 30.

The main rotor system 12 can include a main rotor controller 50 configured to receive commands from the FCC 75 to control one or more actuators 55, such as a mechanical-hydraulic, electric, or electrohydraulic actuator, for the rotor blade assemblies 20 of FIGS. 1 and 2. In an embodiment, pilot inputs 74 including cyclic, collective, and throttle commands may result in the main rotor controller 50 driving the one or more actuators 55 to adjust a swashplate assembly (not depicted) for pitch control of the rotor blade assemblies 20 of FIGS. 1 and 2. Alternatively, pitch control can be performed without a swashplate assembly.

The translational thrust system 30 can include a propeller pitch controller 60 configured to receive commands from the FCC 75 to control one or more actuators 65, such as a mechanical-hydraulic, electric, or electrohydraulic actuator, for the propeller blades 33 of FIGS. 1 and 2. In an embodiment, pilot inputs 74 include a propeller pitch command for the propeller pitch controller 60 to drive the one or more actuator 65 for pitch control of the propeller blades 33 of FIGS. 1 and 2.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine E may include one or more instances of the EECU 80 to control engine output and performance. Engines E may be commanded in response to the pilot inputs 74, such as a throttle command. Although controllers 50, 60, 75, and 80 are separately depicted, it will be understood that one or more of the controllers 50, 60, 75, and 80 can be combined, e.g., main rotor controller 50 can be implemented within FCC 75.

Rather than simply passing pilot inputs 74 through to various controllers 50, 60, and 80, the FCC 75 includes a processing system 90 that applies models and control laws to augment commands based on aircraft state data. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and communicate with the main rotor controller 50, the propeller pitch controller 60, the EECUs 80, and other subsystems (not depicted).

Figure 4:
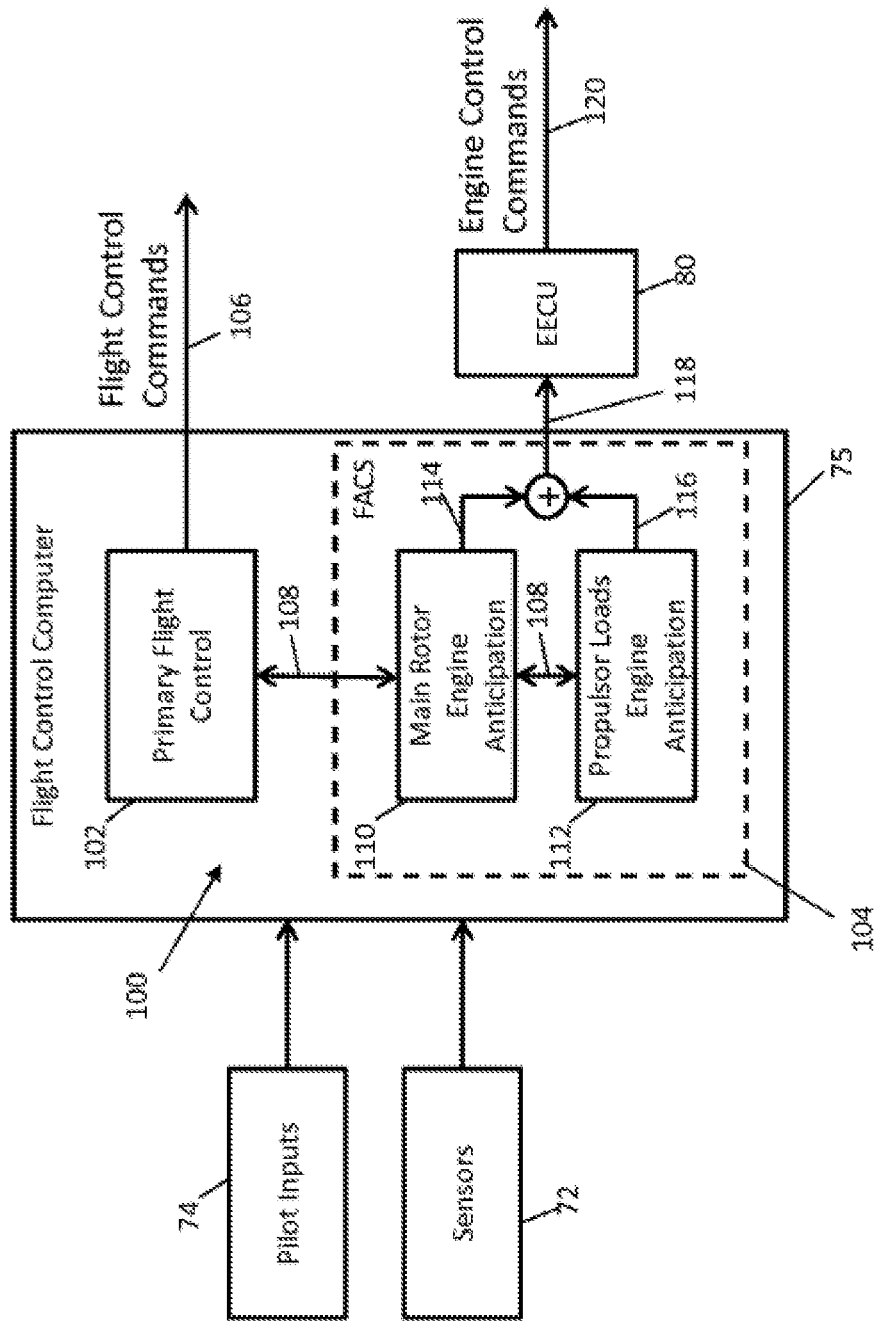
FIG. 4 is a schematic diagram of control logic in a flight control computer of a rotary wing aircraft according to an embodiment.

FIG. 4 depicts a portion of control logic 100 in the FCC 75. The control logic 100 may be embodied as executable instructions in the memory 94 of FIG. 3, where the processing circuitry 92 of FIG. 3 is configured to read and execute the control logic 100. The control logic 100 can include a primary flight control (PFC) 102 and a flight augmentation and cueing system (FACS) 104. The PFC 102 and FACS 104 may execute model following control laws to provide both control and stability augmentation such that pilot inputs 74 are shaped into desired aircraft responses. Desired aircraft responses may be passed through an inverse aircraft model to obtain (e.g., after mixing and kinematics) flight control commands 106 to make the aircraft 10 of FIGS. 1 and 2 produce an aircraft response. The difference between the desired response and the aircraft response can be fed back to drive errors towards zero. Separate control laws can be implemented for controlling yaw, pitch, roll and collective of the aircraft 10 of FIGS. 1 and 2. The PFC 102 may provide control command signals, while the FACS 104 can provide conditioning and/or trimming for the PFC 102 to produce the flight control commands 106. The flight control commands 106 are routed to various subsystems to control the aircraft 10, such as to the main rotor system 12 and the translational thrust system 30 of FIGS. 1-3, in addition to other controllers (not depicted).

The PFC 102 and FACS 104 can receive and/or produce aircraft state data 108 based on the sensors 72, pilot inputs 74, and other derived or received parameters. The FACS 104 may include main rotor engine anticipation logic 110 and propulsor loads engine anticipation logic 112. Alternatively, the main rotor engine anticipation logic 110 and propulsor loads engine anticipation logic 112 are located elsewhere within the FCC 75 as part of the control logic 100. The main rotor engine anticipation logic 110 determines an estimate of power required to maintain a reference rotor speed (such as, for example, 100% rotor speed) as rotor power demand 114 (anticipated rotor power demand), when the flight control commands 106 are applied to the main rotor system 12. The main rotor engine anticipation logic 110 may provide specific rotor control shaping based on the aircraft state data 108 and model-following control logic for each controlled axis of the PFC 102 and FACS 104.

The propulsor loads engine anticipation logic 112 determines an estimate of power required for the auxiliary propulsor 32 of the translational thrust system 30 according to the aircraft state data 108. The propulsor loads engine anticipation logic 112 outputs an auxiliary propulsor power demand 116 (anticipated auxiliary propulsor power demand) that is combined (e.g., summed) with the rotor power demand 114 to produce total power demand anticipation signal 118 (also referred to as power demand 118) for one or more instances of the EECU 80 in the engine control system 85 of FIG. 3. The total power demand anticipation signal 118 is a feed forward anticipation signal to request a corresponding amount of power from the engines E via engine control commands 120. Based on timing differences between the engines E and flight surfaces, the engine control commands 120 may take effect ahead of the flight control commands 106.

Figure 5:
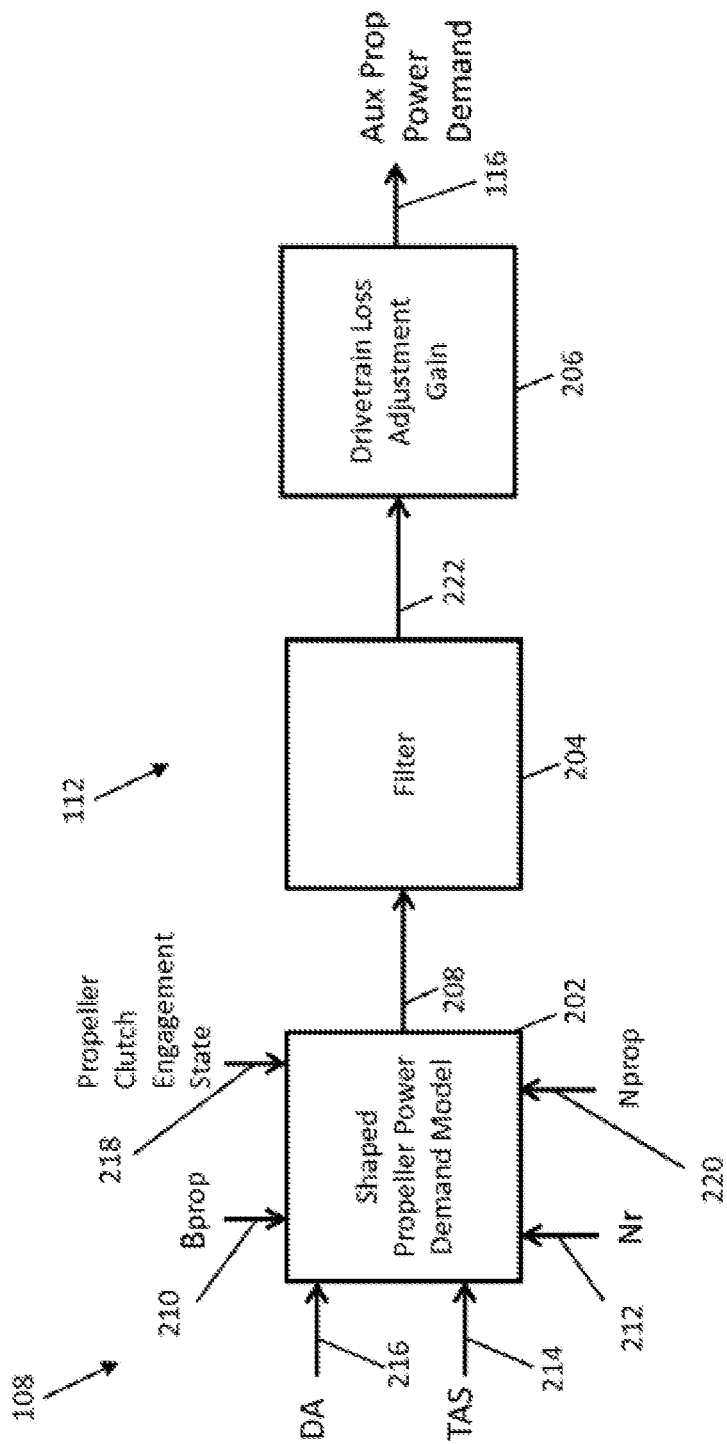
FIG. 5 is a schematic diagram of propulsor loads engine anticipation logic in a flight control computer of a rotary wing aircraft according to an embodiment.

FIG. 5 depicts an example of the propulsor loads engine anticipation logic 112 in greater detail. In an embodiment, the propulsor loads engine anticipation logic 112 includes a shaped propeller power demand model 202, a filter 204, and a drivetrain loss adjustment gain 206. The shaped propeller power demand model 202 may receive a variety of aircraft state data 108 to perform a table lookup operation to produce a propulsor power demand value 208. For example, the aircraft state data 108 can include a propeller pitch command ($B_{prop}$) 210 for the propeller blades 33 of the auxiliary propulsor 32 of FIGS. 1-2 as a modeled parameter. The aircraft state data 108 may also include a reference rotational rate (Nr) 212 of the auxiliary propulsor 32 about axis P of FIG. 1 as a modeled parameter, where Nr is a reference drivetrain/rotor rotational speed rather than a sensed speed. The aircraft state data 108 can also include sensor-based data, such as an airspeed or true airspeed (TAS) 214 of the aircraft 10 and a density of air (DA) 216. Together, $B_{prop}$ 210, Nr 212, TAS 214, and DA 216 collectively define flight regimes where power demand for the auxiliary propulsor 32 represents a significant fraction of total power from the engines E. For example, the propulsor power demand value 208 may be greater for higher Nr 212, higher TAS 214, and lower DA 216. Thrust provided by the auxiliary propulsor 32 may vary as a function of the $B_{prop}$ 210 and Nr 212, where a greater propulsor power demand value 208 may be needed for higher thrust regimes. Extrapolating equations may be employed by the shaped propeller power demand model 202 when one or more of the $B_{prop}$ 210, Nr 212, TAS 214, and DA 216 are received as values defined outside of table index limits. One or more range limits can be applied rather than an extrapolation. As an alternative to table-based operations, the shaped propeller power demand model 202 can be implemented using physics-based equations based on the aircraft state data 108 such as $B_{prop}$ 210, Nr 212, TAS 214, and DA 216 to produce the propulsor power demand value 208.

In embodiments that include the propeller clutch 43 of FIG. 1, the shaped propeller power demand model 202 may produce the propulsor power demand value 208 based on a propeller clutch engagement state 218 and a propeller speed 220 ($N_{prop}$). Engaging and disengaging the propeller clutch 43 can produce a transient power demand change. Propeller clutch 43 engagement, as indicated by the propeller clutch engagement state 218, produces an increase in aerodynamic load as propeller speed 220 increases, and also requires additional power to accelerate propeller inertia up to a target speed. Propeller clutch 43 disengagement, as indicated by the propeller clutch engagement state 218, removes a potentially significant load from the drive train. Additional engine anticipation algorithms to predict and provide anticipation for the aerodynamic and inertial load demands associated with engagement/disengagement of the propeller clutch 43 further enhance engine control. Pre-knowledge of a requested change in the propeller clutch engagement state 218 assists in anticipation computations. To predict the load demand change associated with accelerating the propeller to speed may also be based on the inertia of the propeller, the desired change in propeller speed 220, and the duration/shape of the desired rotor speed response during clutch engagement.

The propeller speed 220 represents a rotational speed of the propeller (i.e., the auxiliary propulsor 32 of FIGS. 1 and 2), while Nr 212 is a reference rotor/drive train rotational speed, e.g., a reference rotational speed of drive shaft 40 of FIG. 1. The FACS 104 of FIG. 4 provides the estimated power demand of the main rotor and propeller systems at a specified reference rotational speed, and the EECU 80 uses the total power demand anticipation signal 118 to help minimize error between actual (sensed) Nr and reference Nr 212. When the propeller clutch 43 of FIG. 1 is engaged, the actual propeller rotation rate (propeller speed 220) can be compared to a reference rotational rate (Nr 212), and a change in propeller rotational speed that needs to be achieved during engagement of the propeller clutch 43 is computed. The power required to effect this change in propeller speed 220 over the desired time frame is also computed, and included as part of the propulsor power demand value 208.

The filter 204 can be applied to the propulsor power demand value 208 to produce a filtered power demand value 222. In an embodiment, the filter 204 is a lag filter configured to smooth transitions between discrete values of the propulsor power demand value 208 over a period of time. The filter 204 can also provide a time delay to the propulsor power demand value 208 to approximate dynamics of the auxiliary propulsor 32. For example, changes to the translational thrust system 30 may occur more rapidly than changes to the main rotor system 12.

The drivetrain loss adjustment gain 206 can be applied to the filtered power demand value 222 to produce the auxiliary propulsor power demand 116. The drivetrain loss adjustment gain 206 may be used to account for drivetrain losses in the transmission 25, including losses through the drive shaft 40 and the auxiliary propulsor gearbox 42 of FIG. 1. Although depicted separately, it will be understood that the drivetrain loss adjustment gain 206 can be incorporated into one or more coefficients of the filter 204 or incorporated into the shaped propeller power demand model 202. Accordingly, the auxiliary propulsor power demand 116 is based on the propulsor power demand value 208, as well as effects of the filter 204 and the drivetrain loss adjustment gain 206. When the propeller clutch 43 of FIG. 1 is included, the auxiliary propulsor power demand 116 is also based on characteristics associated with engagement/disengagement of the propeller clutch 43, e.g., propeller clutch engagement state 218 and propeller speed 220.

Exemplary embodiments include a method of providing engine anticipation for propulsor loads on a rotary wing aircraft, such as the aircraft 10 including a main rotor system 12, a translational thrust system 30, and an engine control system 85 as described in reference to FIGS. 1-5. The FCC 75 produces flight control commands 106 for the main rotor system 12 and the translational thrust system 30. The FCC 75 also produces a rotor power demand 114 associated with applying the flight control commands 106 to the main rotor system 12. The FCC 75 additionally produces an auxiliary propulsor power demand 116 associated with applying the flight control commands 106 to the translational thrust system 30. The FCC 75 provides the engine control system 85 with a total power demand anticipation signal 118 (i.e., a power demand feed forward anticipation signal) as a combination (e.g., a summation) of the rotor power demand 114 and the auxiliary propulsor power demand 116. The propulsor loads engine anticipation logic 112 can perform a table lookup operation and/or perform calculations using a shaped propeller power demand model 202 based on aircraft state data 108 to produce a propulsor power demand value 208, where the auxiliary propulsor power demand 116 is based on the propulsor power demand value 208. Filtering of the propulsor power demand value 208 by the filter 204 produces a filtered power demand value 222, and applying a drivetrain loss adjustment gain 206 to the filtered power demand value 222 produces the auxiliary propulsor power demand 116.

Technical effects include an enhanced ability of an engine control system to maintain constant rotational speed of a drive system during aircraft maneuvers that either involve commands to an auxiliary propulsor, i.e., changes to propeller blade pitch, or that change an aircraft flight condition in a way that otherwise affects the power demand of the propulsor, i.e., changes to airspeed or drivetrain reference speed. In a coaxial helicopter with a propulsor, collective-based anticipation alone may be insufficient to adequately control rotor speed where the propulsor contributes a significant fraction of total power in a number of flight regimes. Including propulsor loads engine anticipation logic as a feed-forward signal to an engine control system can enable predictive adjustments to power requirements as the helicopter initiates a maneuver that changes an amount or fraction of power demanded by the propulsor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A flight control system for a rotary wing aircraft comprising a main rotor system, a translational thrust system, and an engine control system, the flight control system comprising:
a flight control computer configured to interface with the main rotor system, the translational thrust system, and the engine control system, the flight control computer configured to:
receive a first input and a second input, the first input being sensor-based data and the second input being a command input;
produce flight control commands for the main rotor system and the translational thrust system,
produce an anticipated rotor power demand associated with the main rotor system,
produce an anticipated auxiliary propulsor power demand associated with the translational thrust system via propulsor loads engine anticipation logic, the propulsor loads engine anticipation logic receiving the sensor-based data and the command input as two inputs and producing the anticipated auxiliary propulsor power demand based on the sensor-based data and the command input, and
provide the engine control system with a total power demand anticipation signal based on a combination of the anticipated rotor power demand and the anticipated auxiliary propulsor power demand.

2. The system according to claim 1, wherein the flight control computer is further configured to produce, via a shaped propeller power demand model, a propulsor power demand value based on aircraft state data, and wherein the anticipated auxiliary propulsor power demand is based on the propulsor power demand value.

3. The system according to claim 2, wherein the translational thrust system comprises an auxiliary propulsor including a plurality of propeller blades.

4. The system according to claim 3, wherein the aircraft state data comprises:
a propeller pitch command for the propeller blades and a reference rotational rate of the auxiliary propulsor.

5. The system according to claim 4, wherein the propeller pitch command and the reference rotational rate of the auxiliary propulsor are modeled parameters, and the aircraft state data further comprises:
an airspeed of the rotary wing aircraft and a density of air.

6. The system according to claim 5, wherein the aircraft state data further comprises a propeller clutch engagement state of a propeller clutch and a propeller speed.

7. The system according to claim 4, wherein the aircraft state data further comprises a propeller clutch engagement state of a propeller clutch and a propeller speed.

8. The system according to claim 3, wherein the flight control computer is further configured to:
filter the propulsor power demand value to produce a filtered power demand value; and
apply a drivetrain loss adjustment gain to the filtered power demand value to produce the anticipated auxiliary propulsor power demand.

9. The system according to claim 2, wherein the flight control computer is further configured to:
filter the propulsor power demand value to produce a filtered power demand value; and
apply a drivetrain loss adjustment gain to the filtered power demand value to produce the anticipated auxiliary propulsor power demand.

10. The system according to claim 1, wherein the main rotor system further comprises dual contra-rotating main rotors, and the translational thrust system comprises an auxiliary propulsor configured as a pusher propeller or a puller propeller.

11. A method of providing engine anticipation for propulsor loads on a rotary wing aircraft comprising a main rotor system, a translational thrust system, and an engine control system, the method comprising:
producing flight control commands, by a flight control computer of the rotary wing aircraft, for the main rotor system and the translational thrust system;
producing an anticipated rotor power demand associated with applying the flight control commands to the main rotor system;
producing an anticipated auxiliary propulsor power demand associated with applying the flight control commands to the translational thrust system based on sensor-based data and command input, wherein the sensor-based data includes aircraft state data, the aircraft state data including at least one selected from a group consisting of an airspeed of the rotary wing aircraft and a density of air; and
providing the engine control system with a total power demand anticipation signal based on a combination of the anticipated rotor power demand and the anticipated auxiliary propulsor power demand.

12. The method according to claim 11, wherein producing the anticipated auxiliary propulsor power demand includes:
producing a propulsor power demand value based on the aircraft state data and producing the anticipated auxiliary propulsor power demand based on the propulsor power demand value.

13. The method according to claim 12, wherein the translational thrust system comprises an auxiliary propulsor including a plurality of propeller blades.

14. The method according to claim 13, wherein the aircraft state data further comprises:
a propeller pitch command for the propeller blades and a reference rotational rate of the auxiliary propulsor.

15. The method according to claim 14, wherein the propeller pitch command and the reference rotational rate of the auxiliary propulsor are modeled parameters, and the aircraft state data comprises:
the airspeed of the rotary wing aircraft and the density of air.

16. The method according to claim 13, wherein producing the anticipated auxiliary propulsor power demand based on the propulsor power demand value includes:
filtering the propulsor power demand value to produce a filtered power demand value; and
applying a drivetrain loss adjustment gain to the filtered power demand value to produce the anticipated auxiliary propulsor power demand.

17. The method according to claim 12, wherein producing the anticipated auxiliary propulsor power demand based on the propulsor power demand value includes:
filtering the propulsor power demand value to produce a filtered power demand value; and
applying a drivetrain loss adjustment gain to the filtered power demand value to produce the anticipated auxiliary propulsor power demand.

18. The method according to claim 11, wherein the main rotor system further comprises dual contra-rotating main rotors, and the translational thrust system comprises an auxiliary propulsor configured as a pusher propeller or a puller propeller.

19. A method of providing engine anticipation for propulsor loads on a rotary wing aircraft comprising a main rotor system, a translational thrust system, and an engine control system, the method comprising:
producing flight control commands, by a flight control computer of the rotary wing aircraft, for the main rotor system and the translational thrust system;
producing a rotor power demand associated with applying the flight control commands to the main rotor system;
producing a propulsor power demand value based on aircraft state;
filtering the propulsor power demand value to produce a filtered power demand value;
applying a drivetrain loss adjustment gain to the filtered power demand value to produce an auxiliary propulsor power demand; and
providing the engine control system with a total power demand anticipation signal based on a combination of the rotor power demand and the auxiliary propulsor power demand.

20. The method of claim 19, wherein the translational thrust system comprises an auxiliary propulsor including a plurality of propeller blades.

21. A flight control system for a rotary wing aircraft comprising a main rotor system, a translational thrust system, and an engine control system, the flight control system comprising:
a flight control computer configured to interface with the main rotor system, the translational thrust system, and the engine control system, the flight control computer configured to:
produce flight control commands for the main rotor system and the translational thrust system,
produce an anticipated rotor power demand associated with the main rotor system,
produce an anticipated auxiliary propulsor power demand associated with the translational thrust system based on sensor-based data and command input, and
provide the engine control system with a total power demand anticipation signal based on a combination of the anticipated rotor power demand and the anticipated auxiliary propulsor power demand,
wherein the flight control computer is further configured to produce a propulsor power demand value based on aircraft state data, and wherein the anticipated auxiliary propulsor power demand is based on the propulsor power demand value, wherein the translational thrust system comprises an auxiliary propulsor including a plurality of propeller blades, wherein the aircraft state data comprises a propeller pitch command for the propeller blades and a reference rotational rate of the auxiliary propulsor, wherein the propeller pitch command and the reference rotational rate of the auxiliary propulsor are modeled parameters, and the aircraft state data further comprises an airspeed of the rotary wing aircraft and a density of air.

22. The system according to claim 21, wherein the aircraft state data further comprises a propeller clutch engagement state of a propeller clutch and a propeller speed.

23. A flight control system for a rotary wing aircraft comprising a main rotor system, a translational thrust system, and an engine control system, the flight control system comprising:
a flight control computer configured to interface with the main rotor system, the translational thrust system, and the engine control system, the flight control computer configured to:
produce flight control commands for the main rotor system and the translational thrust system,
produce an anticipated rotor power demand associated with the main rotor system,
produce an anticipated auxiliary propulsor power demand associated with the translational thrust system based on sensor-based data and command input, and
provide the engine control system with a total power demand anticipation signal based on a combination of the anticipated rotor power demand and the anticipated auxiliary propulsor power demand,
wherein the flight control computer is further configured to produce a propulsor power demand value based on aircraft state data, and wherein the anticipated auxiliary propulsor power demand is based on the propulsor power demand value, wherein the translational thrust system comprises an auxiliary propulsor including a plurality of propeller blades, wherein the aircraft state data comprises a propeller pitch command for the propeller blades and a reference rotational rate of the auxiliary propulsor, and wherein the aircraft state data further comprises a propeller clutch engagement state of a propeller clutch and a propeller speed.

* * * * *